United States Patent
Matsushita

[19]

[11] Patent Number: 6,131,984
[45] Date of Patent: Oct. 17, 2000

[54] ATTACHMENT STRUCTURE FOR A SEAT BACK OF A VEHICLE

[75] Inventor: Yasuhiro Matsushita, Shizuoka-Ken, Japan

[73] Assignee: Suzuki Motor Corporation, Hamamatsu, Japan

[21] Appl. No.: 09/249,070

[22] Filed: Feb. 12, 1999

[30] Foreign Application Priority Data

Feb. 13, 1998 [JP] Japan ................................. 10-030690

[51] Int. Cl.[7] ........................................................ B60N 2/02
[52] U.S. Cl. .................................. 296/65.16; 296/65.01; 296/65.09; 296/203.04
[58] Field of Search .................... 296/65.16, 65.17, 296/65.01, 65.05, 65.09, 204, 203.04, 195, 66

[56] References Cited

U.S. PATENT DOCUMENTS

| | | | |
|---|---|---|---|
| 1,525,743 | 2/1925 | Jack | 296/65.09 |
| 1,589,460 | 6/1926 | Cosgrove | 296/65.09 |
| 2,297,198 | 9/1942 | Borgward | 296/204 X |
| 5,263,763 | 11/1993 | Billette | 296/65.17 |
| 5,944,377 | 8/1999 | Vlahovic | 296/204 |

*Primary Examiner*—D. Glenn Dayoan
*Assistant Examiner*—Patricia Engle
*Attorney, Agent, or Firm*—Finnegan, Henderson, Farabow, Garrett & Dunner, L.L.P.

[57] ABSTRACT

A structure to attach a seat back of a vehicle seat to a vehicle body, which increases the seat back attachment strength and simplifies assembly. A linking member connects a hinge to which the seat back is pivotally attached to a rear cross member of the car body. The components are attached together to increase strength of the seat back support, so it can better withstand the forces generated in an accident.

7 Claims, 8 Drawing Sheets

ATTACHMENT STRUCTURE FOR A SEAT BACK OF A VEHICLE

BACKGROUND OF THE INVENTION

1. Field of the Invention

The present invention is directed to a structure for attaching a seat back to the body of a vehicle, and more specifically to a structure to attach the rear seat back to the floor of a car body.

2. Description of Related Art

Vehicle seats, for example car seats, must have enough structural strength and rigidity to withstand the reaction and impact forces arising in an accident due to the mass of a seated passenger. These forces must also be considered when designing attachments of the seat to a vehicle.

FIG. 8 shows as an example a perspective view of a rear seat's surroundings within the vehicle cabin. The rear seat (100) in FIG. 8 has a seat back (101) that is divided in two along the length of the vehicle. When the seat back (101) is folded forward, the vehicle cabin and the trunk are connected and form one integral empty space. When rear seat back (101) is upright, the trunk space to store cargo is located behind the rear seats (100).

When a car of this type sustains a frontal impact, cargo in the trunk space moves forward owing to its inertia. Thus, the weight of that cargo acts directly on the seat backs as an impact force. It is necessary for the seat backs (101) to have sufficient strength to withstand that impact as well as forces due to the seated passengers, therefore the seats must be attached to the vehicle body with sufficiently strong attachment structures. These requirements of high structural strength also exist with respect to seat belts attachment points.

One example of a conventional seat back (101) attachment structure is shown in FIGS. 9a and 9b, depicting a cross section taken along line A—A of FIG. 8, which extends front-to-back in the vehicle at the location where the seat backs (101) are divided. FIGS. 9a and 9b show two different conventional attachment structures, where the seat backs (101) and cushions (102) are depicted as broken lines.

In FIG. 9a a seat back (101) is joined to a center hinge (103) near the bottom of the seat backs where the seats are divided. Center hinge (103) is attached to the rear floor panel (104) by threaded fasteners, and a reinforcement plate (105) is used as a backing. In FIG. 9b, the hinge (103) is attached to a bracket (106) welded firmly to the rear floor panel (104). In these designs, any impact force exerted on seat back (101) is transferred from the center hinge (103) to the rear floor panel (104). Ultimately, the rear floor panel (104) absorbs this impact force, and it becomes difficult to further improve rigidity and strength of the structure.

The center hinge (103) is mounted to the rear floor panel (104) as a single unit, and is a large item. Thus, it is difficult to position the center hinge in the correct alignment during assembly. Correctly positioning these parts requires many man hours, resulting in reduced manufacturing efficiency. Even if a setting jig is used, the setting position of the center hinge is essentially in the center of the rear floor panel, and so the setting jig itself also has to be large-sized to reach that position.

SUMMARY OF THE INVENTION

The advantages and purpose of the invention will be set forth in part in the description which follows, and in part will be obvious from the description, or may be learned by practice of the invention. The advantages and purpose of the invention will be realized and attained by means of the elements and combinations particularly pointed out in the appended claims.

The present invention was developed to overcome limitations of conventional hinges, and one of its objectives is to offer an attachment structure for a seat back of a vehicle seat whereby seat back attachment strength is increased, seat rigidity is also increased, and ease of assembly is further improved.

The attachment structure of the invention is designed for the seat back of a vehicle seat, and includes a hinge pivotally attached to the seat back and attached to the rear floor panel, a rear floor cross member attached to the floor panel at a different position than the hinge along the axial length of the vehicle, and a linking member attached to the floor panel that connects the rear floor cross member to the hinge, and is securely attached to both the hinge and the cross member.

In another embodiment, according to the invention, the rear floor cross member is attached to the rear floor panel by a flange. Said flange, said rear floor panel, and the linking member partially overlap and are welded together. The linking member may be attached to the hinge by threaded fasteners such as screws or bolts.

In a further embodiment, the linking member is attached to the underside of the rear floor panel, and the linking member and the rear floor cross member have respectively a recessed engagement member and a protruding engagement member, by which they are mutually engaged. The linking member in one embodiment is adapted for application to a surface of the floor panel, and is shaped to fit the surface of the floor panel.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention. In the drawings.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

Figure 1:
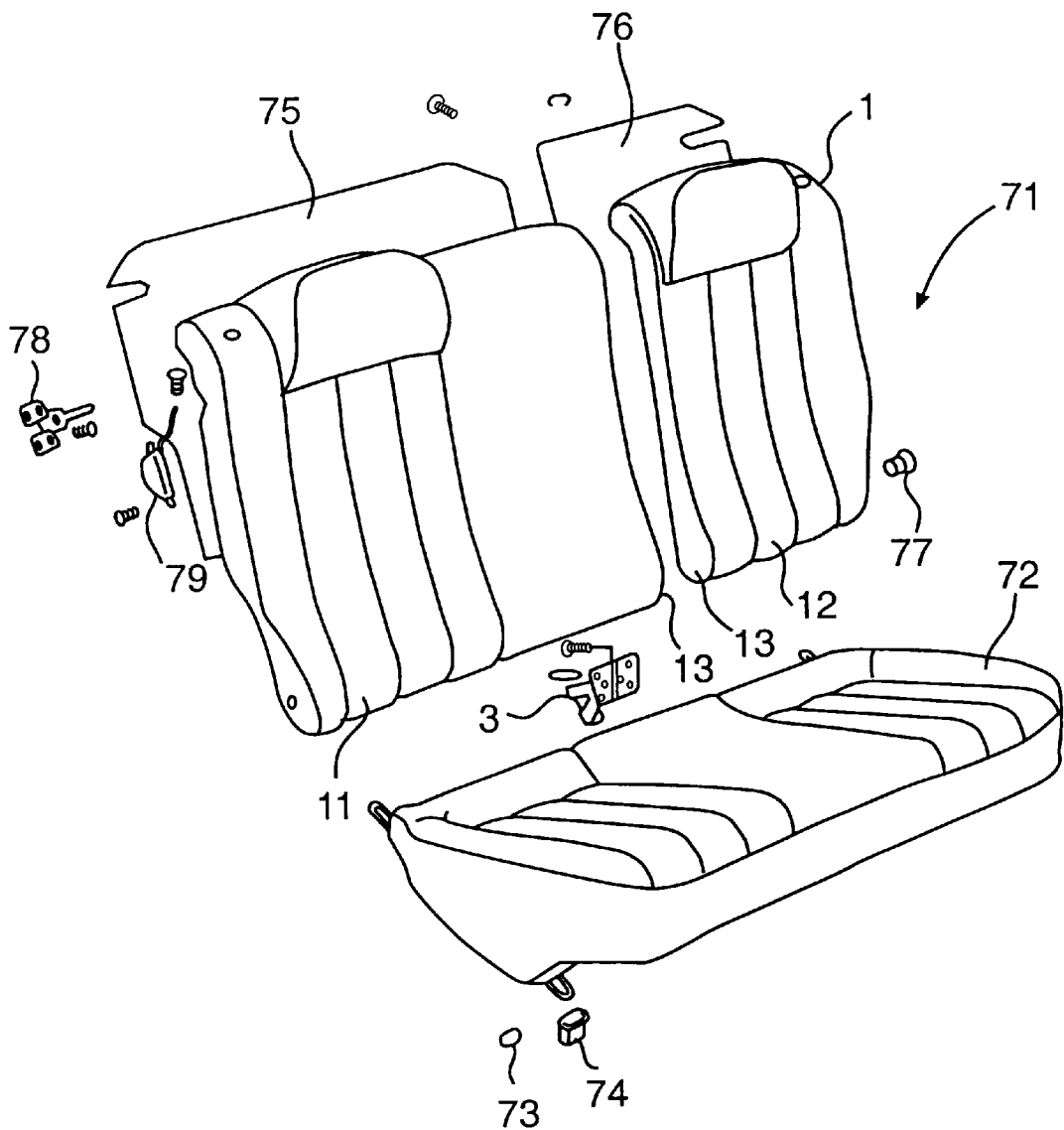
FIG. 1 is an exploded perspective view of a divided collapsible rear seat having a hinge according to one embodiment of the invention.

In the illustrated embodiment, FIG. 1 is an exploded perspective view showing a divided, foldable rear seat. The rear seat (71) has a seat cushion (72) and a seat back (1). Both ends of the seat cushion (72) can be directly attached to the top surface (21) of the rear floor panel (2) by a ring (73) and a hook (74).

The seat back (1) is divided at a location slightly off center, vis-a-vis the vehicle centerline, into a long right seat back (11) and a short left seat back (12). Located behind the seat back (1) are a right carpet (75) and a left carpet (76), respectively.

The seat back (1) is structured so that after release of a lock mechanism, the seat back (1) can move towards the seat cushion (72) by rotating forward in the vehicle. The lock mechanism has a striker and lock indenter (79) attached by screws to the right seat back (11) and the left seat back (12), respectively.

Beneath the two facing sides (13) of the right (11) and the left (12) seat backs, a hinge (3) is attached. This hinge (3) is attached on the rear floor panel.

Figure 2A:
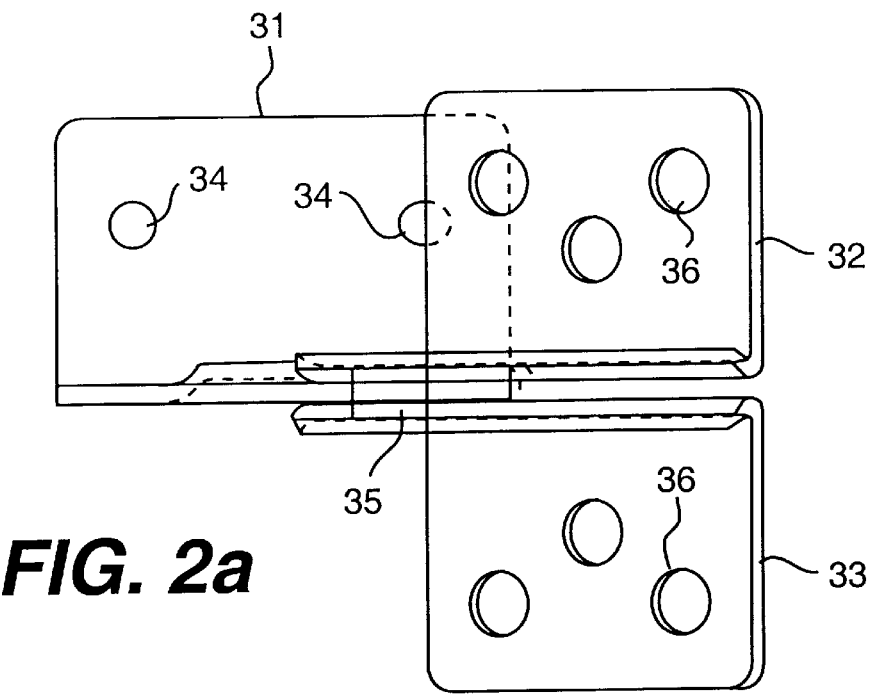
FIGS. 2a–2c show details of the hinge in FIG. 1, with 2a being a top plan view of the hinge, 2b being a side elevation of the hinge, and 2c being a side elevation of the pin connecting the hinge components.
Figure 2C:
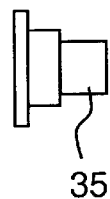
Figure 2B:
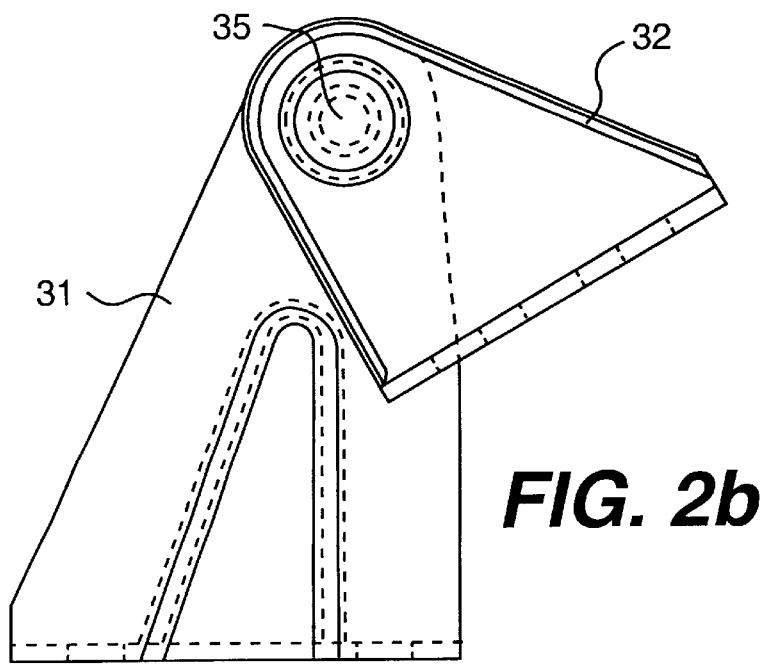

FIG. 2a shows a top elevation view of an embodiment of hinge (3), and FIG. 2b shows a side elevation view of hinge (3). The hinge (3) is a forward-pivoting hinge. The hinge main body (31) comprises two rotating components (32), (33). Two round holes (34) used to thread screws are provided in the hinge main body (31). The hinge main body (31) and the rotating components (32), (33) are axially supported by a pin (35) shown in FIG. 2c. The rotating components (32), (33) each have a hole (36) for attachment to the respective seat backs. The pin (35) is caulked and has no excessive play, so that the rotating components (32), (33) can rotate smoothly.

The sides of the right and left seat backs (11, 12) that are opposite the inner facing sides (13) are each axially supported on the vehicle body by a pivot (77), located coaxially with the pivot axis of the hinge (3). (See FIG. 1.) In this way, the right and left seat backs (11, 12) are axially supported and can freely rotate, each using an identical attachment structure, which includes a hinge (3) and a pivot (77). However, each seat back rotates separately and independently from the other.

Figure 3:
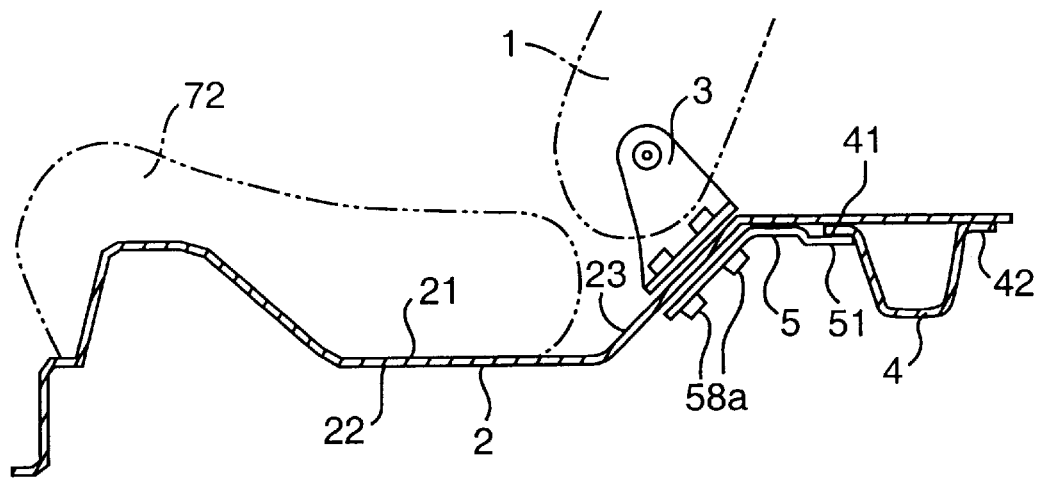
FIG. 3 is a side elevation view of the attachment structure according to one embodiment of the present invention.
Figure 4:
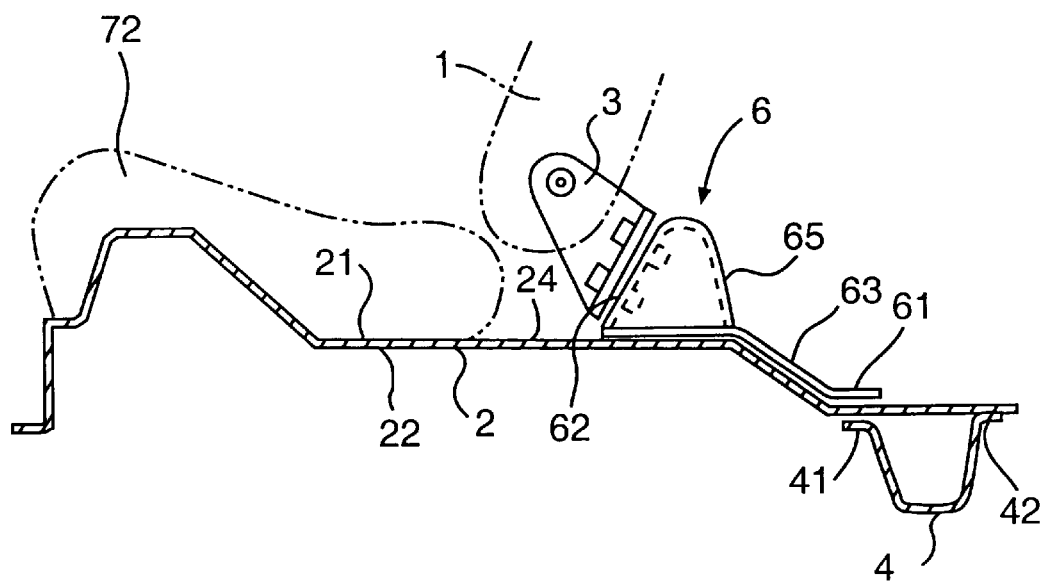
FIG. 4 is a side elevation view of the attachment structure showing a second embodiment of the present invention.
Figure 8:
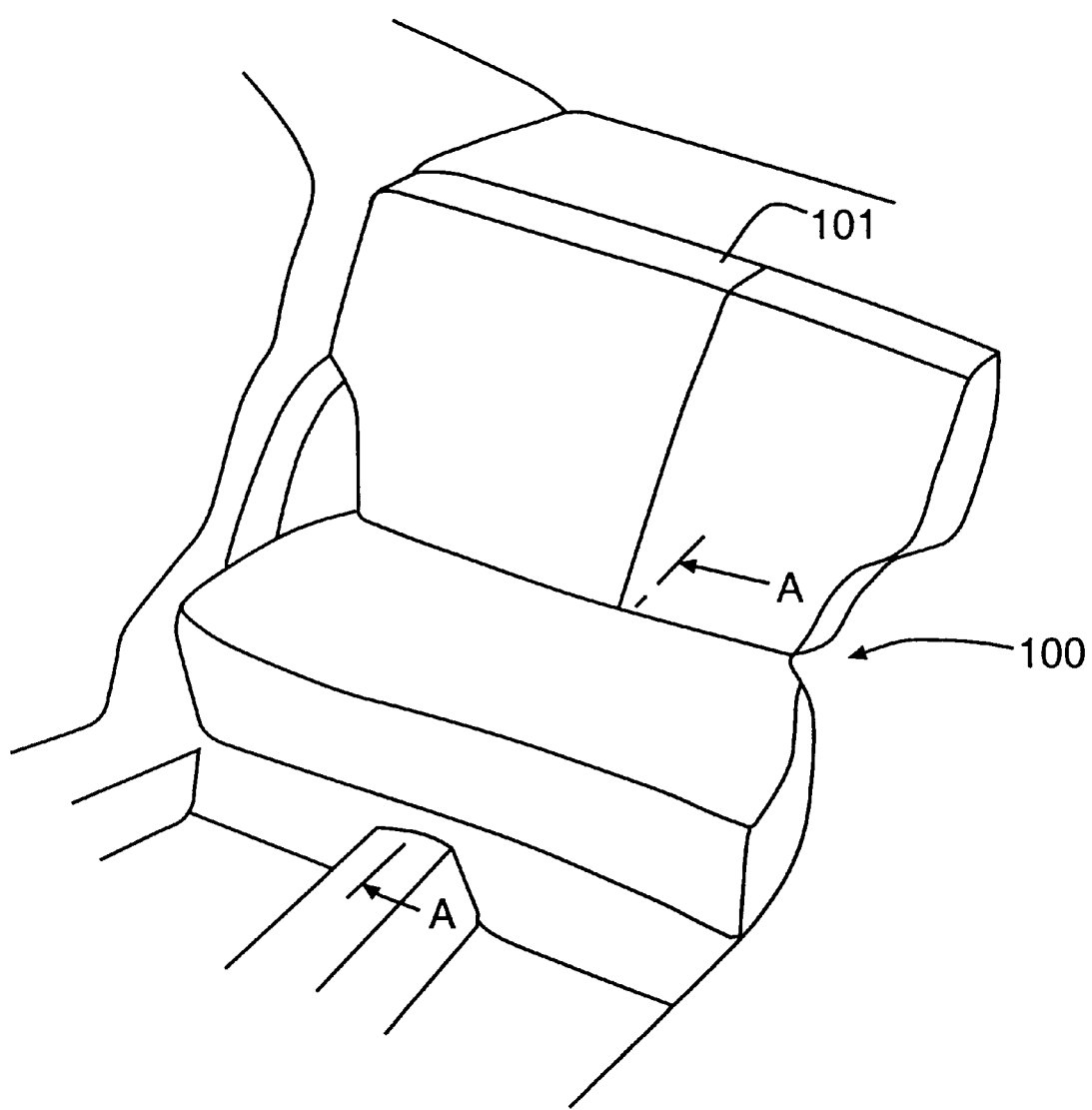
FIG. 8 is a perspective view of the area around the rear seat seen from the car interior.
Figure 9A:
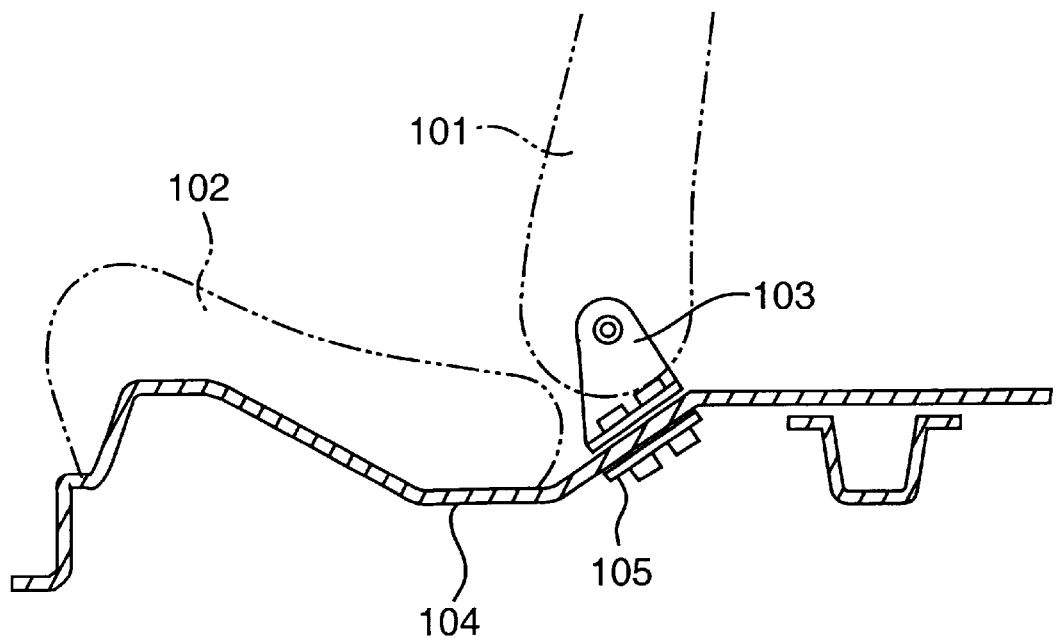
FIGS. 9a–9b are cross sectional views along line A—A of FIG. 8, showing two examples of the prior art attachment structure.
Figure 9B:
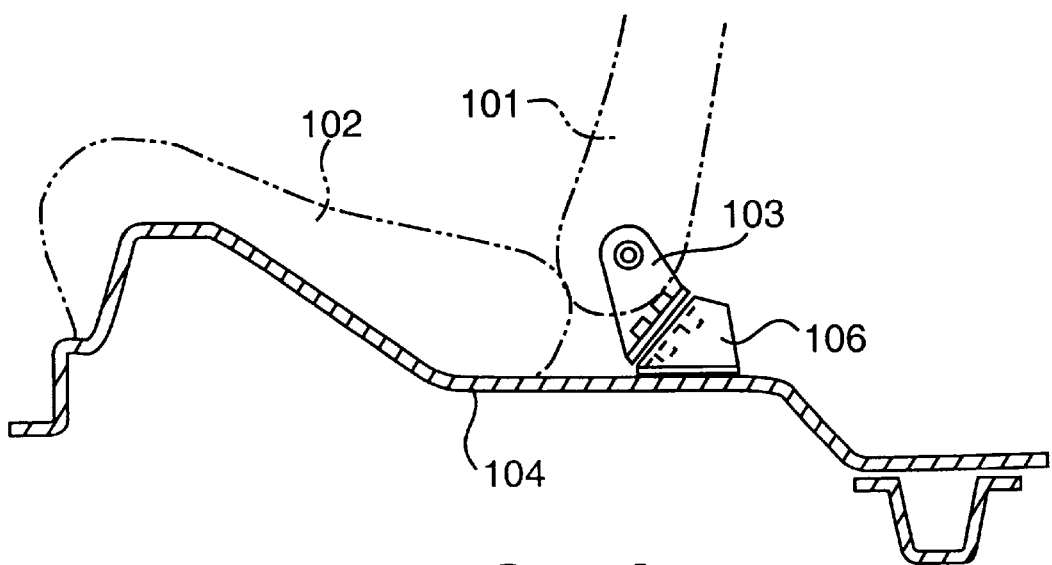

Next, the method for attaching the hinge (3) to the rear floor panel (2) will be explained for two different embodiments shown in FIGS. 3 and 4. These figures are cross sections cut along line A—A of FIG. 8, running axially from front-to-back along the vehicle length where the seat back (1) is divided. An area common to both embodiments is shown in FIG. 8. FIG. 3 shows an embodiment according to the invention which replaces the conventional technology shown in FIG. 9a, and FIG. 4 shows another embodiment according to the invention which replaces the conventional technology shown in FIG. 9b. In both figures, seat back (1) and the seat cushion (72) are indicated by broken lines.

The rear floor cross member (4) is elongated and has a C-shaped cross section with two flanges, and is arranged along the car's width, perpendicular to the car's length. (i.e., perpendicular to the paper surface in FIGS. 3, 4). Flanges (41) and (42) are welded to the vehicle body.

The configurations of the rear floor panels (2) differ in FIGS. 3 and 4. In FIG. 3, the hinge (3) is attached to an inclined part (23) of the rear floor panel. In FIG. 4, the hinge (3) is attached to a flat part of the rear floor panel (2), but the linking member (6) provides an inclined mounting surface for hinge (3). This difference results from differences in internal layout of the vehicle.

In FIG. 3, a reinforcement or linking member (5) is attached to the underside (22) of the rear floor panel (2). The total length of the linking member (5) according to the invention shown in the figures is greater than that of a conventional reinforcement 105 as shown in FIG. 9a. The back end (51) of linking member (5) is attached to the rear floor cross member (4), as shown in FIG. 3.

Figure 5A:
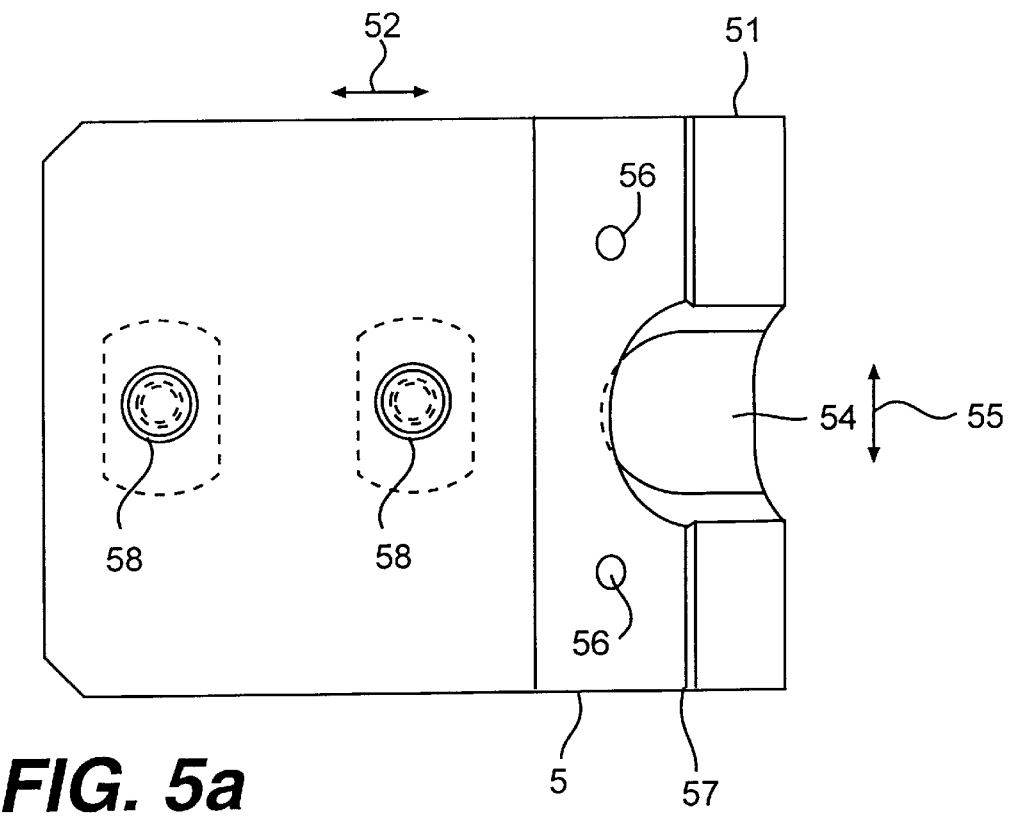
FIGS. 5a–5c show details of the linking member according to the invention shown in FIG. 3, with 5a being a top plan view, 5b being a side elevation view, and 5c being a partial perspective view seen from arrow 5c in FIG. 5b.
Figure 5B:
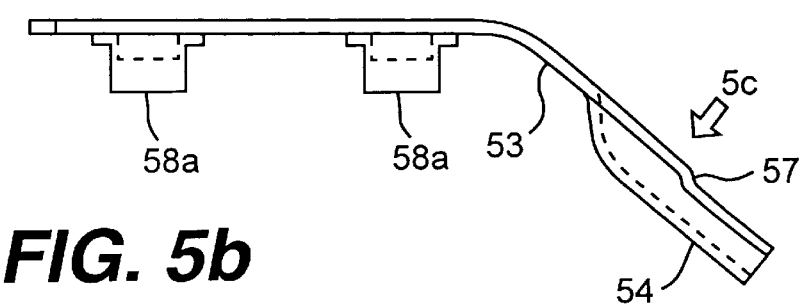
Figure 5C:
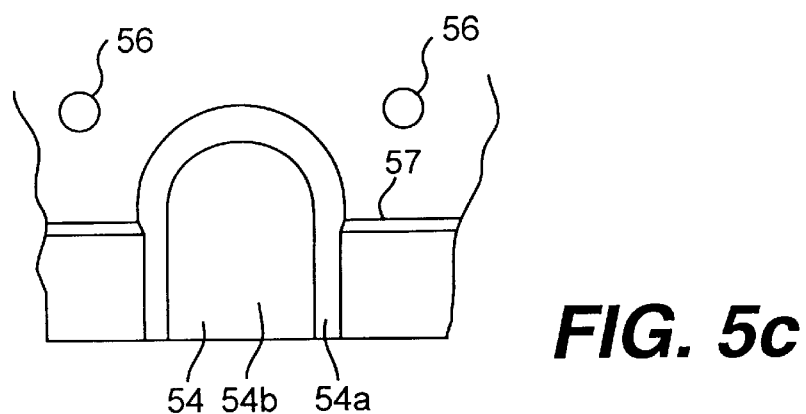

In a preferred embodiment, the linking member (5) is a flat sheet with a bent section (53) located at a specific position along the distance (52), as seen in FIG. 5(b). The bent section corresponds to the shape of rear floor panel (2). Provided the linking member attaches both to the rear floor cross member and to the hinge, its shape is not limiting.

In addition to direct attachment of the linking member to the hinge and to the cross member, the term "linking" in the present specification also includes cases of indirect linking where the rear floor panel is sandwiched between the hinge and the cross member. For example, if the hinge, the linking member, and the rear floor cross member are located on top of the rear floor panel, the linking member can be directly attached to the rear cross member and to the hinge. However, if the hinge is attached on top of the rear floor panel, and the linking member and rear floor cross member are both attached to the underside of the rear floor panel, the linking member is not directly attached to the hinge, but rather is attached by sandwiching the rear floor panel between hinge and linking member. Similarly, when the hinge and linking member are attached atop the rear floor panel and the rear floor cross member is attached to the underside of the rear floor panel, the rear floor panel is sandwiched between the cross member and the linking member. The attachment methods usable when the rear floor panel is sandwiched between the other structural elements include welding (spot welding or other types of low resistance welding), as well as fastening by piercing the rear floor panel and using threaded fasteners.

A recessed engagement component (54) is located approximately along the center line of the linking member. This engagement recessed component (54) is formed by a gradually inclined surface portion (54a) that continues into a U-shaped bottom portion (54b). Two round holes (56) are provided near the recessed component (54) along the short distance (55), and are used to connect a jig during attachment of the linking member to the rear floor panel (2).

A shoulder portion (57) is provided over the entire width of the linking member. The height of shoulder (57) approximately equals the plate thickness of the rear floor cross member (4), as shown in FIG. 3.

Two attachment holes (58) are provided along the front-to-back distance 52 of linking member (5). Nuts (58a) are fixed in a stationary manner into the attachment holes (58) to enable fastening to the hinge (103). The pitch between the attachment holes (58) is identical to that between the round holes (34) of the hinge main body (31), so assembly of the two parts is possible.

Figure 6:
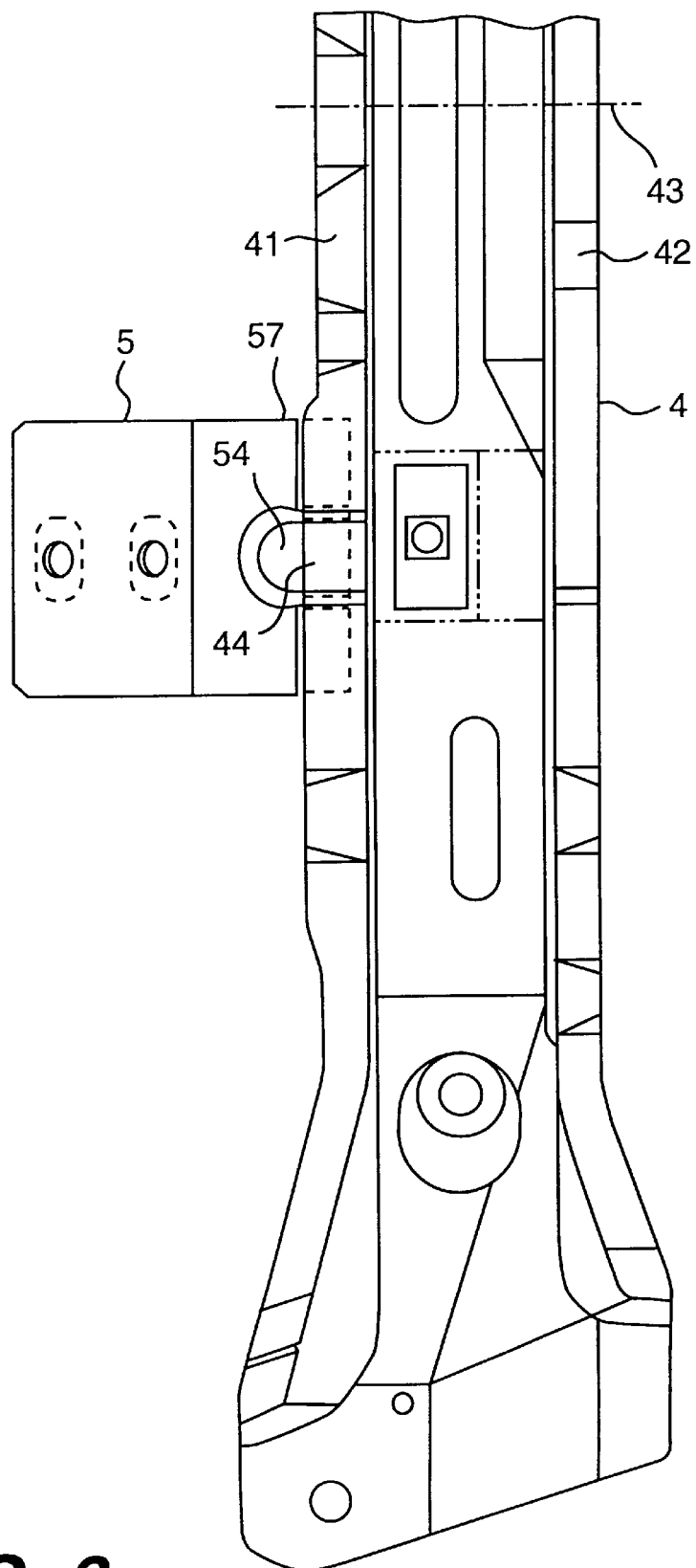
FIG. 6 is a partial top plan view showing the relationship of the rear floor cross member, the rear floor panel, and the linking member shown in FIG. 5.

The following explanation describes the positional relationship between the linking member (5) and the rear floor cross member (4) when they are fastened together. FIG. 6 shows a front view of the rear floor cross member (4) attached to the rear floor panel (2), corresponding to the structure shown in FIG. 3. The center line of the rear floor cross member 4 is indicated by a dot-dash line (43). Since its shape is symmetrical about the centerline, only one-half of the cross member (4) is shown. The linking member (5) partially overlaps flange (41) of the rear floor cross member (4), which is directed toward the front of the vehicle, and is partially covered from beneath by the rear portion (51) of the shoulder (57).

The rear floor cross member (4) has a protrusion (44), also referred to as a protruding engagement member. The shape of the protrusion (44) is compatible with the recessed engagement component (54) and can be engaged in this recessed component (54) of the linking member (5), as shown in FIG. 6. By engaging the recessed engagement component (54) to the protruding engagement member (44), the linking member (5) can be aligned with the rear floor cross member (4), whereby assembly is simplified. In other words, although the linking member (5) is small compared to the rear floor panel (2), it is aligned by connecting it to the rear floor cross member (4) that extends across the rear floor panel (2), along the vehicle's width dimension. Thus, it is easy to align the linking member 5 with the vehicle's length and width axis on the rear floor panel (2). The operation is further simplified by the use of a simple device such as a jig. Also, holes having a pitch identical to that of the attachment holes in the floor panel (omitted from the figure) for attaching hinge (3) are provided in the rear floor panel (2). When these attachment holes are used, the linking member can be aligned with even greater ease and accuracy.

After the linking member (5) is aligned, it is attached at multiple sites by spot welding to the rear floor panel (2) along the reinforcement's length axis. Also, at locations where the linking member (5) and the rear floor cross member (4) overlap, the linking member (5) is spot welded to the rear floor panel (2) so that the rear floor cross member is sandwiched between the linking member and the floor panel. In this way, the rear floor panel (2), the linking member (5), and rear floor cross member (4) become an integral unit fixed in a stationary position.

There is a growing trend in car body design whereby, to lower acceleration to which vehicle occupants are subjected during an impact, the front-to-back rigidity of the car body is reduced to progressively absorb impact energy. However, by partially increasing rigidity by spot welding the linking member (5), which has larger than conventional dimensions, not only to the rear floor panel but also to the rear floor cross member, the impact resistance of seat back (1) improves. In particular, because more impact force is applied to the area around the hinge attachment component in what is approximately the center of the seat back (1), the rigidity of that part can be efficiently improved. The increase in car weight due to this modification is very low. Furthermore, the task of aligning the linking member (5) is simplified. Thus, not only does assembly efficiency increases, but the use of a simple jig is sufficient, and production costs can be kept low. When a hinge (3) is attached to a rear floor panel (2) according to the invention, the hinge can be fastened either above or below the floor panel, without reducing the quality of the assembled seat back (1).

Figure 7A:
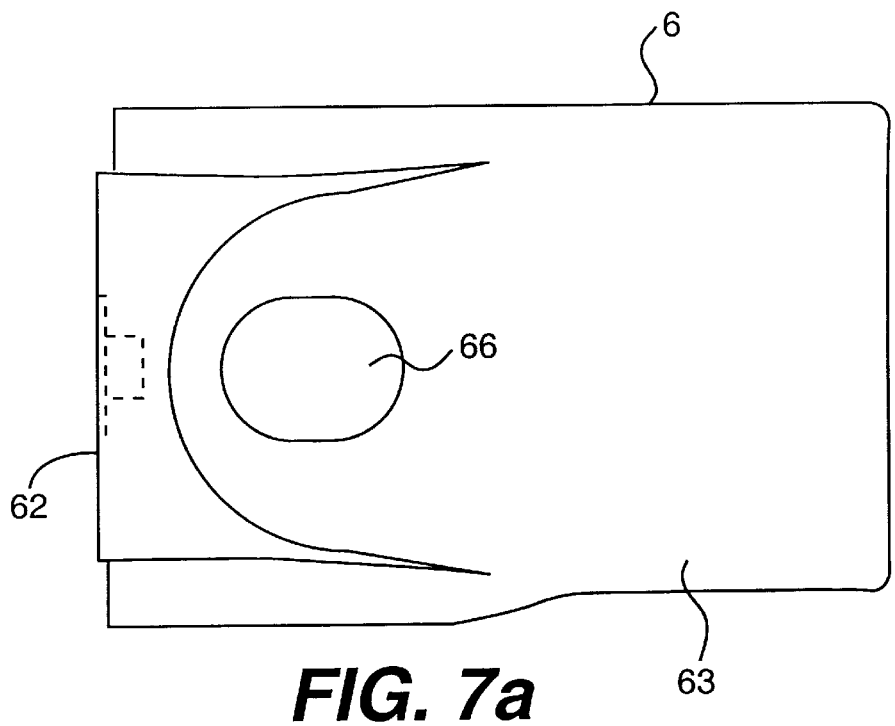
FIGS. 7a–7c show details of the linking member according to an embodiment of the invention shown in FIG. 4, with 7a being a top plan view, 7b being a side elevation view, and 7c being a frontal view.
Figure 7B:
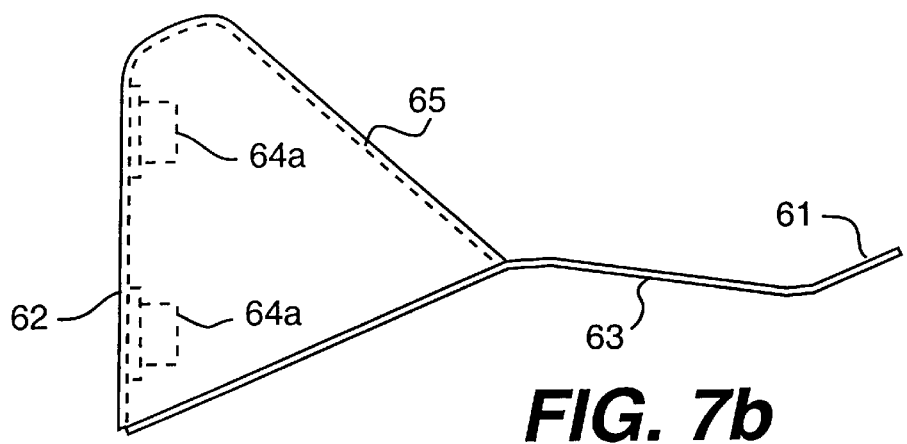
Figure 7C:
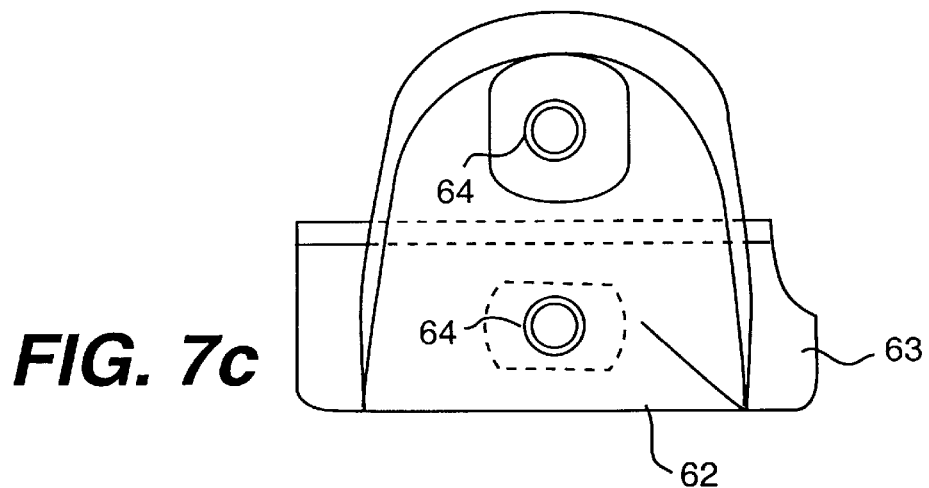

The following explanation describes the use of a second embodiment of the invention, which includes bracket (6) as shown in FIG. 4. FIG. 7 shows several views of bracket (6), including a top view in FIG. 7a, a side elevation view in FIG. 7b, and a front view in FIG. 7c. Bracket (6) shown in these figures has a greater overall length than a conventional bracket shown in FIG. 9b, and has a back end (61) which extends to the attachment site of flange (41). Bracket (6) matches the shape of surface sides (21) of the rear floor panel (2), which has an inclined surface (62), and has a bottom surface (63) which is also shaped to match the shape of the rear floor panel (2). Inclined surface (62) has two attachment holes (64) to connect to hinge (3). Formed on the rear inclined plane (65), opposing inclined surface (62), is an elongated hole (66). Using hole (66), a nut (64a) can be reached and held firmly in place to facilitate threading screws in the attachment holes (64). The pitch of the attachment holes (64) is identical to that of the round holes (34) of the hinge main body (31), as shown in FIG. 2a.

As shown in FIG. 4, the bracket (6) is arranged on a top surface (21) of the rear floor panel (2). Thus, the hinge (3) is affixed to the rear floor panel (2) by the bracket (6). Moreover, the hinge (3) used is analogous to that shown in FIG. 3. Also, owing to the inclined surface (62) of the bracket (6), the same degree of inclination of the seat back (1) as in FIG. 3 is maintained.

Because of the shape of lower part (63), the bracket (6) can be easily aligned along the car's front-to-back direction, and the use of a simple jig is sufficient to ensure accurate assembly.

The back end (61) of the bracket (6) and the rear floor cross member (4) are spot welded so as to sandwich the rear floor panel. Bracket (6), rear floor panel (2), and rear floor cross member (4) become an integral body and are stationary, so that the same advantages of the previous embodiment are obtained.

This invention is also applicable to a design where seat back (1) is divided along the vehicle centerline. Moreover, the invention strengthens the seat structure not only with respect to a frontal impact, but also during a rear impact. In a preferred embodiment, the hinge (3) used is a forward folding hinge. However, a rearward reclining hinge or a rearward reclining hinge with a forward-folding element can be used. Although fastening of the elements used according to this invention can be accomplished by spot welding, the attaching methods are not limited to spot welding. Any method of attaching the structural elements that maintains the components stationary relative to one another can be used.

With the present invention, alignment of the linking member is simplified, and jigs and devices used in the assembly of the hinge can be kept simple. Thus, in addition to the ability to improve assembly, manufacturing costs can be reduced. Because of the linking member, floor rigidity can be increased in areas requiring more strength, and a rear seat structure better capable of resisting impact forces generated in an accident can be constructed.

It will be apparent to those skilled in the art that various modifications and variations can be made in the embodiments of the present invention and in construction of this attachment structure without departing from the scope or spirit of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An attachment structure securing a seat back of a vehicle seat to a vehicle, comprising:
   a hinge pivotally attached to the seat back and attached to a floor panel of the vehicle at an axial position;
   a rear floor cross member attached to the floor panel at another different axial position;
   a linking member attached to the hinge, and the rear floor cross member; and
   wherein the linking member includes means for fastening to the hinge with a threaded fastener.

2. The attachment structure of claim 1, wherein the rear floor cross member further comprises a flange for attaching to the floor panel, and wherein the flange, the linking member, and the floor panel overlap and are welded together at a common axial position.

3. The attachment structure of claim 1, wherein the linking member further comprises a recessed engagement member adapted to cooperate with a protruding engagement member of the floor panel to facilitate alignment of the linking member.

4. The attachment structure of claim 1, wherein the linking member and the hinge are disposed above the floor panel, and the rear floor cross member is disposed below the floor panel.

5. The attachment structure of claim 1, wherein the linking member and the rear floor cross member are disposed below the floor panel, and the hinge is disposed above the floor panel.

6. The attachment structure of claim 1, wherein the linking member is adapted for application to a surface of the floor panel and is shaped to fit the surface of the floor panel.

7. The attachment structure of claim 1, wherein the linking member further comprises an inclined surface, forming an angle with the floor panel, adapted for fastening to the hinge.

* * * * *